(12) United States Patent
Sienel et al.

(10) Patent No.: US 10,666,711 B2
(45) Date of Patent: May 26, 2020

(54) AUTOMATED ADAPTION OF A CODEC

(71) Applicant: Alcatel Lucent, Boulogne Billancourt (FR)

(72) Inventors: Juergen Sienel, Stuttgart (DE); Markus Bauer, Stuttgart (DE); Ralf Klotsche, Stuttgart (DE)

(73) Assignee: Alcatel Lucent, Nozay (FR)

( * ) Notice: Subject to any disclaimer, the term of this patent is extended or adjusted under 35 U.S.C. 154(b) by 444 days.

(21) Appl. No.: 14/392,303

(22) PCT Filed: Jun. 5, 2014

(86) PCT No.: PCT/EP2014/061678
§ 371 (c)(1),
(2) Date: Dec. 23, 2015

(87) PCT Pub. No.: WO2014/206702
PCT Pub. Date: Dec. 31, 2014

(65) Prior Publication Data
US 2016/0182611 A1    Jun. 23, 2016

(30) Foreign Application Priority Data
Jun. 24, 2013    (EP) .................................... 13305865

(51) Int. Cl.
*G06F 15/16* (2006.01)
*H04L 29/08* (2006.01)
(Continued)

(52) U.S. Cl.
CPC .............. *H04L 67/10* (2013.01); *G06F 9/541* (2013.01); *H04L 65/602* (2013.01);
(Continued)

(58) Field of Classification Search
USPC ......................................................... 709/201
See application file for complete search history.

(56) References Cited

U.S. PATENT DOCUMENTS 7,188,158 B1 *  3/2007  Stanton ..................... G06F 8/20
                                                    709/220
7,408,569 B1 *  8/2008  Yamaguchi ............ G03B 27/73
                                                    348/125
(Continued)

FOREIGN PATENT DOCUMENTS

EP    2 400 389 A1    12/2011
EP    2 439 949 A1    4/2012
(Continued)

OTHER PUBLICATIONS

Bauer et al. (EP2400389A1, Dec. 28, 2011).*
International Search Report for PCT/EP2014/061678 dated Jul. 1, 2014.

*Primary Examiner* — Razu A Miah
(74) *Attorney, Agent, or Firm* — Fay Sharpe LLP

(57) ABSTRACT

The present document describes a system comprising at least two processing nodes (1) that are connected by a network, and an application distribution function, which automatically distributes processing components (3) of an application to be run on the system over the nodes (1). The system is configured, when a sending processing component and a corresponding receiving processing component are arranged on different nodes, to determine, based on information about the processing component (3) which receive the data, in which representation to send the data via the corresponding communication channel (4).

14 Claims, 11 Drawing Sheets

Figure 1:
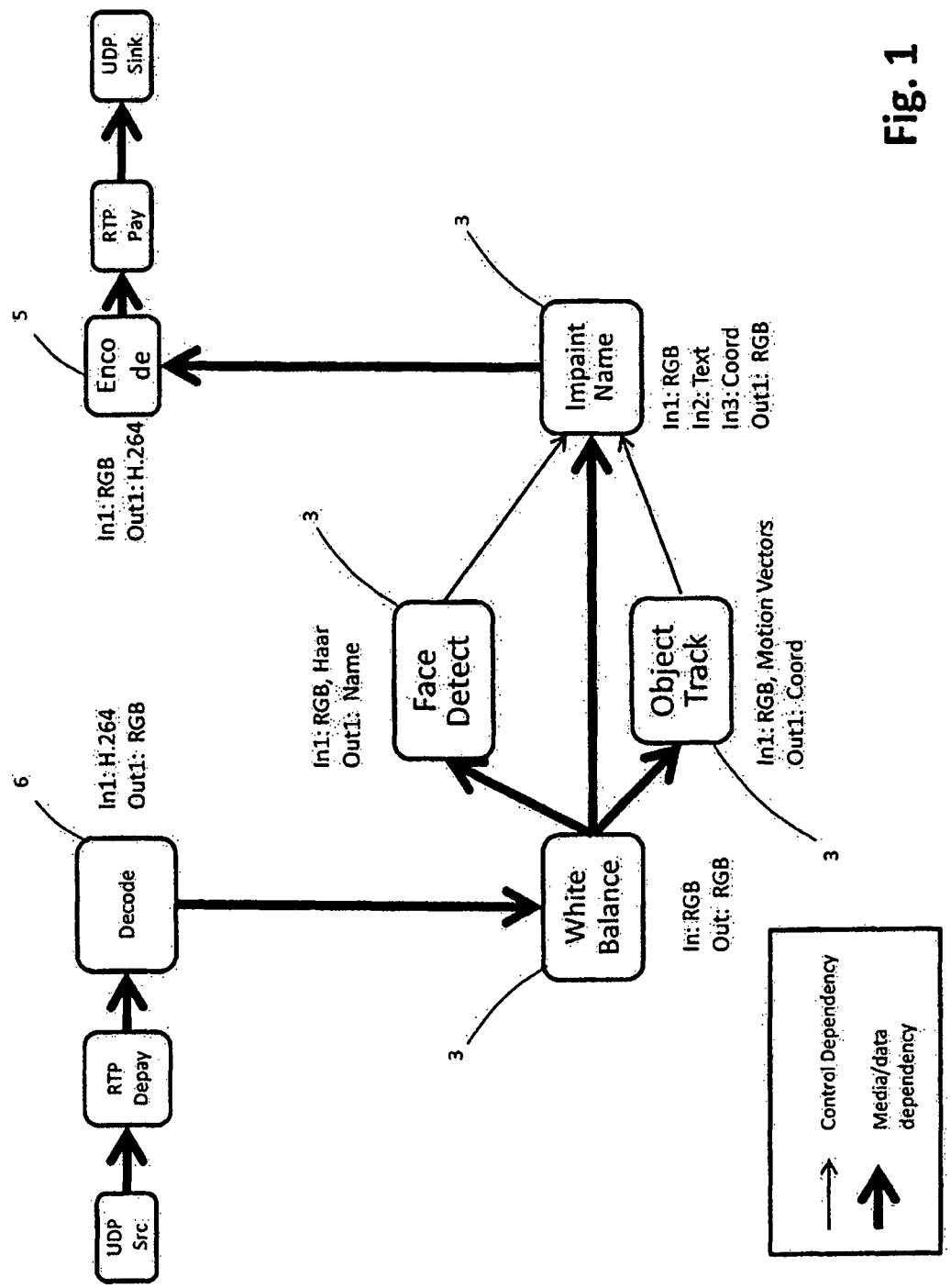

(51) Int. Cl.
*H04L 29/06* (2006.01)
*G06F 9/54* (2006.01)
*H04N 7/14* (2006.01)
*H04N 21/4788* (2011.01)

(52) U.S. Cl.
CPC ........... *H04L 65/604* (2013.01); *H04N 7/147* (2013.01); *H04N 21/4788* (2013.01)

(56) References Cited

U.S. PATENT DOCUMENTS

| | | | | |
|---|---|---|---|---|
| 7,679,649 | B2* | 3/2010 | Ralston | H03M 7/40 348/207.1 |
| 7,761,863 | B2* | 7/2010 | Illowsky | G06F 1/3203 717/167 |
| 8,094,631 | B2* | 1/2012 | Banerjea | H04W 52/0225 370/338 |
| 8,214,905 | B1* | 7/2012 | Doukhvalov | G06F 21/577 726/24 |
| 8,719,415 | B1* | 5/2014 | Sirota | G06F 9/5061 709/221 |
| 8,896,717 | B2* | 11/2014 | Ralston | H03M 7/40 348/207.1 |
| 2002/0002605 | A1* | 1/2002 | Honda | H04L 29/06 709/219 |
| 2003/0061042 | A1* | 3/2003 | Garudadri | G10L 15/30 704/254 |
| 2003/0065755 | A1* | 4/2003 | Gunji | G06F 9/4411 709/221 |
| 2003/0188005 | A1* | 10/2003 | Yoneda | H04L 29/06 709/231 |
| 2003/0233458 | A1* | 12/2003 | Kwon | H04L 67/16 709/227 |
| 2003/0233464 | A1* | 12/2003 | Walpole | H04L 29/06 709/231 |
| 2004/0172658 | A1* | 9/2004 | Rakib | G08B 13/19656 725/120 |
| 2004/0199653 | A1* | 10/2004 | Amini | H04L 29/06027 709/231 |
| 2004/0210320 | A1* | 10/2004 | Pandya | H04L 29/06 700/1 |
| 2005/0108414 | A1* | 5/2005 | Taylor | H04L 29/06027 709/231 |
| 2005/0267953 | A1* | 12/2005 | Suzuki | H04L 67/125 709/220 |
| 2006/0136570 | A1* | 6/2006 | Pandya | G06F 17/30985 709/217 |
| 2008/0300878 | A1* | 12/2008 | Bennett | G06F 17/27 704/251 |
| 2009/0112966 | A1* | 4/2009 | Pogrebinsky | H04L 67/10 709/201 |
| 2009/0125638 | A1* | 5/2009 | Phippen | G06F 9/541 709/246 |
| 2010/0058422 | A1* | 3/2010 | Ochiai | H04L 47/10 725/116 |
| 2010/0299313 | A1* | 11/2010 | Orsini | H04L 9/085 707/652 |
| 2011/0090970 | A1* | 4/2011 | Kim | H04L 12/184 375/240.26 |
| 2011/0113453 | A1* | 5/2011 | Ralston | H03M 7/40 725/62 |
| 2011/0212717 | A1* | 9/2011 | Rhoads | G06K 9/00664 455/420 |
| 2011/0277027 | A1* | 11/2011 | Hayton | H04L 63/0815 726/8 |
| 2011/0296440 | A1* | 12/2011 | Laurich | G06F 21/602 719/326 |
| 2012/0331088 | A1* | 12/2012 | O'Hare | G06F 21/6227 709/214 |
| 2013/0050260 | A1* | 2/2013 | Reitan | G06F 3/011 345/633 |
| 2013/0144603 | A1* | 6/2013 | Lord | H04L 12/1831 704/9 |
| 2013/0225128 | A1* | 8/2013 | Gomar | H04W 12/06 455/411 |
| 2014/0013003 | A1* | 1/2014 | Giladi | H04L 65/60 709/231 |
| 2016/0182591 | A1* | 6/2016 | Sienel | G06F 9/541 709/204 |

FOREIGN PATENT DOCUMENTS

| JP | 2009-49905 A | 3/2009 |
|---|---|---|
| WO | WO 2010/039915 A1 | 4/2010 |
| WO | WO 2011/073008 A1 | 6/2011 |

* cited by examiner

AUTOMATED ADAPTION OF A CODEC

The present document relates to a system for reducing a network usage in distributed application processing scenarios with minimal computing effort. More particularly, the document relates to the area of distributed real-time processing of video data in processing nodes being, e.g., deployed in network centric data centers.

Nowadays data, computer programs, and applications are increasingly stored and executed in network centric data centers ("the cloud"). However, due to bandwidth and end-to-end delay requirements, particularly in the technical field of distributed real-time processing of media data in the cloud, the processing of real-time media particularly requires sensibility with respect to transport data across network links.

In a Platform-as-a-Service (PaaS) approach, functionality is provided that automatically distributes an application consisting of separable software components onto processing nodes located in different parts of the network. This distribution is applied in order to minimize traffic in the transport networks exploiting locality of shared data, optimize the resource utilization of processing nodes, and improve the user experience by processing delay sensitive tasks close to a user's location in the network. In a cloud based processing environment, different data transport scenarios between separate software tasks executed on distinct processing nodes may apply. Typical scenarios are media data transport to and from end-devices to a media processing node across a network, media data transport between processing nodes within a single data-center, and media data transport between processing nodes located in different data-centers.

A typical application scenario which profits from distributed processing on a service platform is for example video chat. In the video chat scenario, e.g. a group of people join a virtual shared video environment/video chat room. Each person streams video data of its camera(s) into the cloud. The video chat service combines all media streams of users meeting in such a shared environment and generates (i.e. processes) a personalized view of the virtual room for each participant. Thus, each person in the virtual room receives back a personalized rendered view of all (other) participants.

It is assumed that an application, e.g. video chat, may be divided into distinct processing parts (i.e. processing components) executed across different processing nodes in the cloud. A typical scenario comprises:

Preprocessing of the camera signals like e.g. back-ground subtraction, face or activity detection, e.g. a "who is speaking"-function, being, preferably, arranged on processing resources located close to the data generating source.

A module controlled by a user's interaction to determine the specific part of the video that should be extracted from a real camera's signal, which has a high resolution, by selecting the pan/tilt and zoom factors of a virtual camera.

Video mixing functionality merging all the different video signals of people in the chat room on processing resources in the cloud, preferably located in the "center of delay" for all participants.

Personal viewpoint rendering, controlled by, e.g., interactive gestures or other means of an end-user, preferably located on processing resources located close to this user.

For example, a processing part in the video chat application may be background extraction. This part might be built up and composed of a number of processing components performing distinct tasks like color conversion, comparing of an actual frame with a background model, statistical update of the background model, foreground mask generation, etc.

For example in a platform scenario, components may communicate via a message passing interface connecting output port(s) of a sending component with input port(s) of one or more receiving components. A developer may create and maintain a running instance of his application by orchestrating a dynamic service logic graph composed from the different processing elements which make up the application.

Manipulations of the graph include creation, modification or removal of components, and establishment or release of connections between components in a dynamic fashion. From the developer's perspective, the platform behaves like a single virtual processing resource and it is the task of the platform to deploy the different components of the application in a suitable way onto the physical infrastructure resources as described before.

Typically, the processing capacity which is needed for each specific task depends on different media parameters. The parameters may be image resolution, frame rate, number of participants, etc. Further the number of resources that is needed to execute the desired functionality may depend on resource capabilities and the current load situation of individual processing nodes (which can fluctuate quickly).

Therefore, it is generally difficult for an application developer to predict, how the different components of the application are most efficiently distributed across the different processing nodes. As only the platform has the required information, it is the task of the platform to decide how to resolve resource bottlenecks, appearing at service runtime, on a resource by a redistribution of some processing parts/components, which are currently executed on this resource, onto another currently less utilized resource.

However, a fundamental problem for distributing the components of a video application, like e.g. a video chat service, is the huge amount of data exchanged between components because many media processing components primarily operate on a series of pixel values (i.e. a single video frame). Thus, a component sends typically a complete frame of pixel values, i.e. an uncompressed video frame (raw data), to its output port(s). This makes it difficult to split the application components across different processing nodes as the raw 'video' traffic needs to be transported over the network connecting the different processing nodes, i.e. exchanged, and thus may lead to network congestion. Therefore, media data being exchanged between components executed on different processing resources needs to be compressed in a meaningful way.

As the developer of a service graph at the development time is not aware of how the platform will split the different service components across processing resources at service runtime, there is a need for platform functionality which automatically includes compression (i.e. encoding/decoding) into communication paths whenever needed.

Known video codecs (coder and decoder, such as MPEG4, VP8, H.264) are generic and efficient compression utilities for video signals. These codecs exploit the spatio-temporal similarities inherent in the video signal by predictive steps and analysis by synthesis techniques by extracting parameters, so that a signal being similar to an original signal can be recovered from the compressed parameters. If a block of pixel is found similar to its neighbor block, only a pointer to the neighbor block and a residual error is transmitted instead of the full information of the actual block. In a similar way, blocks may be predicted by interpolating from former and later frames and motion vector compensating movements. Blocks that cannot be predicted are encoded using transform coefficients (commonly DCT) and are quantized. Finally, data is run-length encoded for additional compression.

For particular processing functions, like object detection, pixel-wise similarity of original and reconstructed texture of an object is typically less important than preserving other more characteristic information like the object's shape. Therefore, complex prediction methods and pixel-exact reconstruction techniques may overshoot the requirements.

Another way to obtain information from image sequences is to extract features that are representative for specific content. Such features form a specialized representation of the original data that is useful for particular processing functions such as object detection but cannot be used by some other processing functions which require different representation schemes. Some features like Scale-Invariant-Feature-Transform (SIFT) or Speeded-Up-Robust-Features (SURF) generalize for a broad set of use cases, and others like patch based convolution filters, e.g. used in object recognition, provide information preservation only for a single task. These feature extraction methods are highly discriminative, but do often not allow a reconstructing of the original signal from the feature domain. And, they are typically not applicable as general purpose representation format. These types of features may be considered as an example of additional transform processing resulting in a sparse representation enabling good compression properties.

The present document addresses the technical problem of providing a system for reducing the effective network usage in distributed application processing scenarios with minimal computing effort.

A system and a method (as well as an application distribution unit) are provided for reducing the effective network usage in distributed processing scenarios with minimal computing effort by providing a dynamic configurable coding and representation format between two service (processing) components. For example, based on the knowledge about which processing components operate on a data stream (e.g. multimedia data such as video or audio data) that needs to be transmitted, a specialized codec may be automatically configured that preserves information as needed by the receiving processing components in an optimal way. In other words, a configurable representation and compression format for data transmission between processing components of a distributed application (service) is suggested. The representation and compression format is configured during service runtime taking into account information from a service graph and receiving side processing functions. For example, an encoding process for transmitted data is dynamically adapted during runtime according to requirements in terms of which information should be preserved of subsequent processing functions, thereby achieving optimized media compression.

The configuration of a codec may be derived at runtime from a service graph of an executed application, e.g. taking into account descriptions of the functionality of the application components. The codec of a communication channel (e.g. traversing a boundary of a node and carrying multimedia data) may be configured based on information of the media representation required by subsequent processing functions at the receiving node. Furthermore, the transmitted data format can be dynamically adapted at service runtime in case the service graph is modified following the application's internal service logic.

Furthermore, the dynamic configuration of the transmitted data enables to select an appropriate representation format for the transmitted data in order to optimally represent the transmitted data, such as media data comprising e.g. video or audio data, based on requirements of subsequent components in the processing flow. For example, if the receiving processing function operates on features extracted from the transmitted data, it may be more efficient to generate the features in the sending component and transmit a representation of the features instead of the original data. In addition, if the receiving processing function is able to receive data directly in the feature domain, the inverse operation of the feature transform can be avoided in the decoder.

It is noted that in the following the term "system" may be replaced by the word "platform". The term "data" may specify information which is exchanged/transferred between parts/nodes/components of the system. The term "message" may mean, substantially, a header of a message plus the data to be transmitted (payload). The term application graph and service graph are used synonymously.

The term "encoding/decoding" specifies encoding and/or decoding. Particularly, it specifies encoding and decoding meaning that at one side, from which the message/data is sent, the data is encoded (compression) and at the other side, the receiving side, the data is decoded. In the following it will be assumed that a first component is a component which sends data, i.e. it is a "sending component", and that a second component is a component which receives data, i.e. it is a "receiving component". However, it is noted that the system can comprise more than two nodes and more than two components. Further, a plurality of different communication channels can be established between two or more nodes. The terms "receiving node" and "sending node" specify a node which comprises the receiving/sending component. The term node may specify a computing resource or a host which preferably comprises at least one processor, at least one storage device, and at least one network adapter. In other words, a node is preferably a fully operational, stand-alone processing unit which is connected in a network with other nodes.

The selection and/or configuration of an encoding/decoding schema for data transmission between processing components depending on properties of the processing components may, specifically, be achieved by analyzing an application (service) graph and the actual deployment situation of the application, i.e. which components are executed on which processing resources (nodes) and which communication channels in the service graph traverse external network links (a node boundary). The system (platform) may determine which subsequent processing functions (i.e. processing components) and associated media types are processing a media stream at a remote processing resource. Based on this information, the behavior of a codec (compression and decompression function) may be configured in order to reduce the amount of data traversing the network link (communication channel) between a sending component and subsequent components according to the functional requirements of receiving component(s).

The aspect of an automatically adapted codec may include e.g. selection of transform processing, prediction methods, etc. For example, in standard codecs the discrete cosine transformation (DCT) is used as this transform preserves the basic structure and quantization impacts at most higher frequencies of the encoded media stream, which are of less importance for a human viewer. For a component, like e.g. an object detection, that is located behind a encoder/decoder pair, the use of a more specific transform processing might be much more appropriate (e.g. an edge filter or another interest operator) if it increases the sparsity in the feature space. A sparse representation is characterized by having (close to) zero values in many (non-relevant) parts of the image. Thus, quantization preserves only relevant information for subsequent processing step(s) that are executed on the remote processing node on the receiving side of the network link.

Further to the aspect of determining an optimized codec configuration depending on the processing requirements of subsequent components, e.g. by modifying the quantization table of the encoder in a content adaptive manner, a new dimension of flexibility is opened by introducing support of dynamic content, which is available at runtime, aware adaptation which is based on real-time information being exposed by the data consuming processing functions of subsequent components. This is achieved by providing a component interface towards the distributed platform through which a component can provide information to adapt its received media content flow based on the result of internal processing of the previously received data stream. For instance, a component can request to adapt the data-rate to increase or decrease the temporal resolution in frames per second. This is useful, e.g., in a surveillance application where as long as no relevant event is detected, the rate can be reduced. In a similar manner, the spatial resolution can be adapted, e.g. to allow a coarse-grained analysis, and only in case of an incident, to fall back to the full resolution to perform detailed analysis.

Dynamic slicing of the original video will enable the encoder to use different and, potentially, independent parameter sets in parallel to generate independent data for different regions. Supposing multiple recipients of the encoded signal, this will allow defining specific regions of interests with optimized parameters for each recipient. For example, an object-tracking algorithm only uses motion estimation as prediction mode, because the contained information in the motion vectors can be directly used on the remote side.

Note also that this kind of adaptation can be beneficial not only in the case that there is need for efficient media compression between processing functions executed on different processing resources to save network bandwidth. This scheme is also beneficial in case that a sending and a corresponding receiving component are executed on the same processing resource. This aspect allows reducing overall processing needs. For example, in the surveillance example explained above, reducing the resolution of the media stream results in fewer operations for processing the video to detect whether there is an abnormal situation. Only if some abnormal situation is detected, the receiving component will request a higher resolution, it will then do best possible analysis.

In addition, the flexible configuration of the encoder/decoder components including combination of multiple transforms, slice groups etc. in order to support cases in which multiple processing elements operating on the media stream run on the remote side and would require different information from the original signal will be further supported by the configuration and usage of a flexible media transport container, in which the individual information can be grouped together to be transported across the network in a single message and dismantled on the remote node.

According to an aspect an application distribution unit (also referred to as an application distribution function) configured to automatically distribute processing components of an application to be run on at least two processing nodes that are connected via a communication channel is described. The application distribution unit may be configured, when a sending processing component and a corresponding receiving processing component are arranged on different processing nodes, to determine, based on information about the processing component which receives data, in which representation the data is to be sent from the sending processing component via the corresponding communication channel.

According to an aspect, a method for transmitting data between processing nodes of a distributed processing environment is provided. The method may comprise distributing processing components of an application to be run on the distributed processing environment over the processing nodes that are connected via a communication network. In order to communicate data, an outgoing port of a sending processing component may be connected with an inbound port of a receiving processing component via a communication channel established in the network. If it is determined that the sending processing component and the receiving processing component are arranged on different nodes, i.e. the communication channels extends through a node boundary and includes a network link, the method may comprise determining, based on information about the receiving processing component, in which representation to send data via the corresponding communication channel. The information about the receiving processing component may include information about processing performed by the receiving component and/or information about which data the receiving component uses during processing, e.g. which parts of the original data that the sending component intends to send is relevant for the receiving component. The representation of the data may include, for example, a selection of the original data, a transformation of the original data, and/or an encoding (or compression) of the original data. Once the appropriate data representation is determined, a data converter to convert the data to be transmitted into the determined representation may be invoked and the converted data in the determined representation may be sent from the node of the sending component to the node of the receiving component.

According to an aspect, a sending processing node may comprise at least one execution environment, at least one processing component, and at least one outgoing port being connectable via a communication channel with a receiving processing node for sending data through the communication channel. The execution environment may be configured to establish the communication channel. The sending processing node may be configured to determine, based on information about a receiving processing component being located on the receiving processing node, in which representation to send the data via the communication channel. As such, the sending processing node may comprise the application distribution unit. A receiving processing node may comprise at least one processing component, and at least one inbound port being connectable via a communication channel with a sending processing node for receiving data through the communication channel. The receiving processing node may be configured to send information to the sending processing node about the processing component being located on the receiving processing node. Alternatively or in addition, the receiving processing node may comprise an application distribution unit which is configured to inform the sending processing node in which representation the data is to be sent.

According to an aspect, a system may comprise at least two processing nodes. The nodes may be connected by a communication network. Further, the system may have an application distribution function or the system may comprise an application distribution unit. The application distribution function or unit may automatically distribute processing components of an application to be run on the system over the nodes. Further, a node may have an execution environment. An execution environment may include means for connecting an outgoing port of a processing component sending data with an inbound port of a processing component receiving data via a communication channel. Further, the system may be configured, when a sending processing component and a corresponding receiving processing component are arranged on different nodes, to determine, based on information about the processing component which receives the data, in which representation to send the data via the corresponding communication channel. The system may further be configured to send the data in the determined representation.

Possible representations of data may include one or more of: an original data format of the sending processing component; spatially, temporally or spectrally reduced representations of the original data, compressed or encoded representations of the original data, representations in a transformed domain, and/or features extracted from the original data or from one of the representations mentioned before.

In other words, the system may be configured to determine which data and with which data properties data is to be sent via the communication channel. The determining about which data and with which data properties data is sent may be based on information about processing components which receive data. "Which data" preferably means the "representation", such as a representation of video or image data in a specific color space, e.g. RGB, CMYK, black/white. Further, the representation may specify a representation of features of media data in a feature space, or the representation of media data in a spatial domain. For example, a representation of video data in a spatial domain may specify that only a part (cut out) of a video frame is used. Further, the representation may specify that the data is, for instance, encoded or raw data. The term "data properties" preferably specifies properties such as a data size, e.g. including a resolution size of media data, a data type format, a frame rate, e.g. for video data, etc.

A node comprising a sending component is a sending node. A node comprising a receiving component is a receiving node. Encoding/Decoding specifies that the data is encoded before being transferred through the communication channel and is decoded before being received by the receiving component. The term codec is used for a corresponding pair of encoder and decoder.

A specific example of the above-described system is a system for reducing the effective network usage in distributed video processing scenarios with minimal computing effort by providing a dynamic configurable coding and representation format between two processing components of the video service. For example, based on the knowledge about which processing components depend on a video stream, a specialized codec preserving information as needed by the dependent processing components is automatically configured.

Preferably, an encoded representation of data may be determined in case that the data to be transferred through the communication channel is media data, such as video data, audio data and/or image data. If an encoded representation of data is determined, the system may further be configured to instruct a codec manager of the sending node to instantiate an encoder based on information about processing applied by a subsequent processing component, and to send a request to the receiving component node to instantiate a decoder which corresponds to the encoder in order to reconstruct the information preserving part of the original data.

Further, the system may comprise a codec manager to instantiate or adapt an encoder and a decoder during runtime of the application. The codec may be a combination of encoding functions including a type of transform processing, a type of prediction method, a quantization type, and a type of entropy coding or a method to extract representative features. The system may further comprise a media stream encoder, a data compression unit, and/or a feature extraction unit, for converting data to be sent into a data transmission format by processing the data in at least one of a spatial, temporal or spectral domain. Thus, data may be processed in at least one of a spatial, temporal or spectral domain. A high degree of freedom is available for adapting a codec. The system may select one of many available codec configurations so that each situation can be handled during an application processing with an optimal codec, particularly in view of reducing the network usage. Further, a dynamic configuration of the codec enables to select the appropriate configuration in order to optimally represent the transmitted media data based on requirements of subsequent components in the processing flow. The codec format may be dynamically adapted at service runtime in case the service graph is modified following the application's internal service logic.

Usable codec combinations may be stored in the system so that a codec configuration for possible application scenarios may be quickly available. For example, in case of video data processing different codec configurations may be available for encoding video data with high or low bit rates, high or low tolerated prediction error levels, etc. Further, the encoding domain may be selected based on data dependencies. E.g., a component performing background extraction of image or video data may require data mainly in the spatial domain. Thus, based on the knowledge of the system about data dependencies that the receiving component is, for example, performing background extraction, the system may instantiate a codec only for encoding in the spatial domain for the respective communication channel.

Further, the system may further comprise a media stream encoder, a data compression unit, and/or a feature extraction unit, for converting data to be sent into a data transmission format by processing the data in at least one of a spatial, temporal or spectral domain.

The system may further comprise a service graph analyzer to acquire information on data dependencies between the processing components and/or information on processing operations performed by receiving processing components (directly or indirectly). The data dependency information and/or the processing information is/are used to determine the representation in which to send data to the receiving components. Further, the system may comprise a connection manager. The system may be further configured to activate the service graph analyzer in order to acquire information about data dependencies between processing components. Acquired dependency information about the data dependencies may be used to determine the representation, i.e. which data and with which data properties data. Further, the connection manager or a system functionality may activate the service graph analyzer.

Further, the dependency information preferably comprises information about communication channels. For example, dependency information about communication channels may include information about which processing component is connected via a communication channel with another processing component. Further, the dependency information about communication channels may include whether a communication channel traverses a boundary of a node, i.e. uses a node-external network link. The dependency information may include an entire service logic graph or only parts of the service logic graph, e.g. some specific communication connections between processing components.

Further, the dependency information may include information about which data type format a processing component may process. For example, if a communication channel is established between two processing components being located on different, remote nodes, it may be necessary to encode/decode data to be transferred, and the processing node and/or the processing component at the receiving side of the communication channel may indicate that the receiving component may only process a limited number of encoding/decoding format types.

Further, the dependency information may include information about a processing being carried out at a receiving processing component. Therefore, the receiving processing component may report the required information which the receiving processing component requires for the processing. Alternatively, the system may determine the required information for the processing at the receiving processing component from a service description, in which said required information is stored specifically for each component. One example may be that it may be comprised in the dependency information that the receiving component of a communication channel carries out background extraction of video or image data. Accordingly, the system may determine, based on the dependency information that background extraction is carried out at the receiving processing component, that high resolution data is required at the receiving component. Thus, the system may e.g. determine to send raw data or data being encoded with a small quantization error signals.

In addition, the dependency information may, for example, include further information about the receiving processing node, such as a work load status, processing capacities of the receiving component and/or the receiving node, etc.

The service graph analyzer may further be adapted to determine during runtime of said application whether data dependencies have changed. The codec manager may be adapted to re-configure a pair of corresponding encoder and decoder being instantiated for an existing communication channel, preferably in case that data dependencies have changed. Thus, the service graph analyzer may be adapted to determine, during runtime of said application, whether a distribution of the processing components has changed. A change of the distribution may happen, e.g., when a new component is created and/or a processing component needs further processing capacities. In other words, the codec may be adapted to changed data dependencies during runtime. A change of data dependencies may occur when a re-distribution (reallocation) of the processing components took place. For example, in case that a processing component of a communication channel is moved from one node to another node. Therefore, the system is enabled to automatically respond to and handle changes during runtime of the application processing. An application developer does not need to take care of these changes.

Further, the system may be configured to determine whether a communication channel traverses a boundary of a node, and to determine, when the communication channel traverses a boundary of a node, whether encoding/decoding of data to be transferred via the communication channel is required. The traversal of the boundary of a node may be detected when the communication channel uses an external transport network. For example, if the node is a unit comprising a processor, storage means and network terminals, an external transport network may be defined to be a network which connects nodes with each other, and more specifically the network terminals of the nodes. The traversal of a boundary of the node may be defined as the traversal of a network link. Preferably, the traversal of a boundary of a node may be detected in case that a network protocol, such as RTP, TCP, UDP, IP, is used for sending the data through the communication channel. Hence, the system is able to decide automatically whether an encoded transfer of data via a communication channel is required. The further automation of system functionality allows that the system may flexibly reduce data traffic whenever it is required. An application developer does not need to take care about the encoding/decoding anymore.

According to another aspect, a method and system are provided for reducing the effective network usage in a distributed processing environment by lowering the data rate for information in a transmitted media stream that is of less importance for the processing of the receiving component(s) or completely omitting irrelevant information. Information about relevance is provided by the receiving component(s) by applying relevance analysis functionality or other means that determines the relevance of received content. This relevance information can guide the encoder to improve content (data) compression in an adaptive way for the concerned communication channel during service runtime, e.g., leads the reduction of spatial, temporal or spectral resolution to less bits per transport entity. Platform functionality running on the nodes may collect relevance information from the processing components and provide this information to sending component(s). For this purpose, a feedback channel may be set up between nodes and processing components. Thus, content-adaptive data compression is achieved, taking into account information made available from the receiving side processing functions. The information feed back to the sending side of the communications channel may be used by the codec manager of the node hosting the sending component to adapt e.g. the configuration of the applied compression function (e.g. a video encoder) based on the relevance of the content. The encoder (and the corresponding decoder) may increase or decrease the spatial resolution, the temporal rate and/or accuracy of specific encoding/decoding parameters based on the relevance of the content, thereby limiting processing efforts and transport bandwidth.

This exploits information being available at runtime and being available for analysis from the receiver side (receiving node) to achieve better compression results. For example, reducing the effective network usage in a distributed application processing scenario is enabled for applications, such as video streaming, audio streaming, video chat, etc., by lowering the data rate for information in the transmitted data stream that is irrelevant for the processing of the receiving components. In other words, relevance information may be considered to the overall processing.

Information about relevance (or irrelevance, respectively) may be exposed by the receiving components, e.g., by applying their processing and analysis functionality or other means that may determine the relevance of the received content. This just in time information behind the compressed link (that means the communication channel which transmits encoded data) may guide the encoder to improve the adaptation of the compression in a content adaptive way for the concerned link during service runtime.

The above-mentioned advantages are not achievable by using only information that is available at the source (i.e. the sending processing resource/component), as it is done with prior art coding technologies. Rather, platform functionality running on each host/node collects information from the components executed behind the compressed network link and sends it back to the processing resource hosting the sending component of the encoded link, using a feedback channel in the transmission. This information being available at runtime is then used to adapt a configurable compression utility (e.g. an encoder) executed on the processing resource hosting the sending component. Note that this is executed transparent to the application developer of such a service, because from the service logic flow no care must be taken if the components are executed on the same or distinct resources. Media compression may be included into the component's communication path by the underlying platform autonomously, and only if needed.

Moreover, it is suggested to represent the content of a media stream by a "relevance map". Such a relevance map can be understood as a representation of the expected importance of received content in spatial, temporal or spectral domain. A component may determine how much a specific data item contributed, i.e. was relevant for, to the actual currently ongoing processing and may predict how much this data will contribute or be relevant for the media processing of a next frame, e.g. in case of video processing. The relevance information may help to better compress the data, such as video data, because a lower relevance guides the codec to use fewer bits, or to allow higher prediction/reconstruction errors.

The relevance map may be represented as a multidimensional matrix, which initially may be a uniform matrix identifying relevance information. Initially, the relevance map identifies an original (unamended) content. E.g., initially the relevance map may be a matrix which comprises only the value "1", or only the value "255", or only any other applicable values. When the relevance map is the matrix containing, e.g., only values of "1", the codec behaves according to a static configuration. As the video stream is processed by the receiving component over time, the receiving processing component may provide information which information in the media stream (data to be transferred or payload) is currently the one most important for executing its media-processing task. This information may then be used to update the relevance map. Thus, over time the relevance map may evolve from, e.g., a matrix containing only values of "1" to a more optimized matrix being tailored to the current needs of the media processing function.

A relevance map may embody the lower bound of information preservation that is needed for processing of the corresponding receiving component. This is advantageous because relevance maps of different components may be combined, so that an optimized configuration for multiple components depending on the same data can be found. A relevance map may be sent to preceding host(s) using the back-channel. The back-channel may be co-initialized with the (forward) communication channel containing the data to be transferred, such as (multi)media data being e.g. video or audio data.

According to an aspect, the nodes of the sending component and of the receiving component may further be connected via a back-channel. The back-channel may be configured to transfer back information from the node of the receiving component to the node of the sending component. The sending node may be configured to determine in which representation to send data via the communication channel between the sending component and the receiving component based on the received back information.

Further, the back information, which may be sent through the back-channel, may be relevance information and/or dependency information and/or processing information being usable to determine which data and with which data properties data is sent via a communication channel. Hence, processing components being connected via a communication channel and a back-channel may, instead of a system functionality or in addition thereto, transmit information about the representation, i.e. which data is to be sent via the communication channel, and with which data properties. Consequently, the work load on the system level being related to evaluating data dependencies may be reduced, and may be shifted to the level of the processing components.

The receiving node may further comprise a relevance manager for collecting and/or combining relevance information of received data for at least one processing component of the receiving node.

Further, the relevance information may be stored in a relevance map, and the relevance information may comprise information about relevance of data for the processing of a processing component in a spatial, a temporal and/or a spectral domain. Relevance information may be preferably information about a contribution of data to the processing of a respective processing component.

Further, the receiving component may be configured to determine how much a part of received data contributes to a currently ongoing processing and to predict how much said data will contribute to processing in a temporally-subsequent processing step of the application.

The determined contribution information may be sent to the node hosting the sending component as back information. The contribution of data to a processing in a subsequent step of an application may e.g. relate to a temporal aspect, i.e. data contribution to a time-wise later processing step, and/or may relate to a service logic aspect, i.e. data contribution to a processing step of the application being placed on a processing component which is allocated behind the actual processing component in the service logic. The back information may be used to update the relevance map.

Values of the relevance map may be updated during application processing based on the back information being provided through the back-channel. Further, values of a plurality of relevance maps of a plurality of processing components may be combined so that a merged relevance-map may created. Further, if data is sent from a sending component to a plurality of receiving components through at least one communication channel, coder and decoder may be adapted based on said merged relevance map which may comprise relevance information for each receiving component. Values in the relevance map may be set between "0" and "1", or "0" and "255", or between any other applicable values. If values between "0" and "1" are used, the value "0" indicates not relevant and the value "1" indicates fully relevant. The relevance information may be stored e.g. in an array or matrix. The matrix may be multidimensional. Further, the matrix initially may comprise only "1"-values. The using of the relevance map enables an automatic and efficient adapting of the processing requirements based on information being available at runtime about the relevance of the processed data. The network usage can be kept at a minimum.

Encoder and decoder of the nodes being connected by a communication channel may be adapted based on the values of the relevance map such that, if values of the relevance map are decreased for parts of data to be sent through the communication channel, less coding bits are spent for this now less relevant part of the encoded signal, and/or a higher prediction error may be allowed by coder and decoder. This allows adapting the system work load flexibly in view of the actual relevance information and/or dependency information.

The values of the relevance map may be adapted when a processing is carried out at a processing component so that the relevance map may always reflect the most actual conditions of the application processing in view of the relevance.

Further, the values of different relevance maps of different processing components may be combined so that a merged relevance map may be created. Assuming that data is sent from a sending component to a plurality of receiving components through one physical communication channel, coder and decoder may be adapted based on said merged relevance map which may comprise relevance information for each receiving component. This has the advantage that several receiving components can receive data from one sending component and/or through one communication channel, and that each receiving component can use the data which is relevant for its processing after the data was sent through the communication channel.

According to an aspect, a method for transmitting data between processing nodes of a distributed processing environment may comprise distributing processing components of an application to be run on the distributed processing environment over the nodes. Further, the method may comprise connecting an outgoing port of a sending processing component with an inbound port of a receiving processing component via a communication channel. Further, the method may comprise determining whether the sending processing component and the receiving processing component are arranged on different nodes. In case it is determined that the sending processing component and the receiving processing component are arranged on different nodes, it may be determined, based on information about the receiving processing component, in which representation to send data via the corresponding communication channel. Further, the method may comprise converting the data to be transmitted into the determined representation, and sending the converted data in the determined representation from the node of the sending component to the node of the receiving component.

Note that the reverse part of the above-described aspects is also covered. If two components previously running on different resources, for some reason at service runtime, are placed on the same resource, the formerly external communication path becomes internal and thus media encoding and decoding functionalities may automatically be removed from the communication path by the platform.

Summarizing, a reconfigurable representation and compression format may be provided taking into account information from the service graph and receiving side processing functions to adapt the encoding process dynamically during run-time according to the requirements of subsequent processing functions, thereby achieving an optimized media compression.

Further, a content adaptive compression format is provided taking into account information made available from the receiving side processing functions by establishing a feedback (back-) channel. The information of the feedback channel may be used on the sender side to adapt the configuration of the compression function based on the relevance of the content. The codec may increase/decrease, e.g., the spatial and temporal rate or the accuracy of specific parameters in order to limit processing effort and transport bandwidth. Consequently, the effective network usage in distributed application processing scenarios is reduced or the quality is improved using the same network usage.

It is noted that the above-outlined aspects may be performed in an apparatus comprising a processor. Computer program instructions being stored on a computer memory may perform the aspects when executed by the processor.

Figure 2:
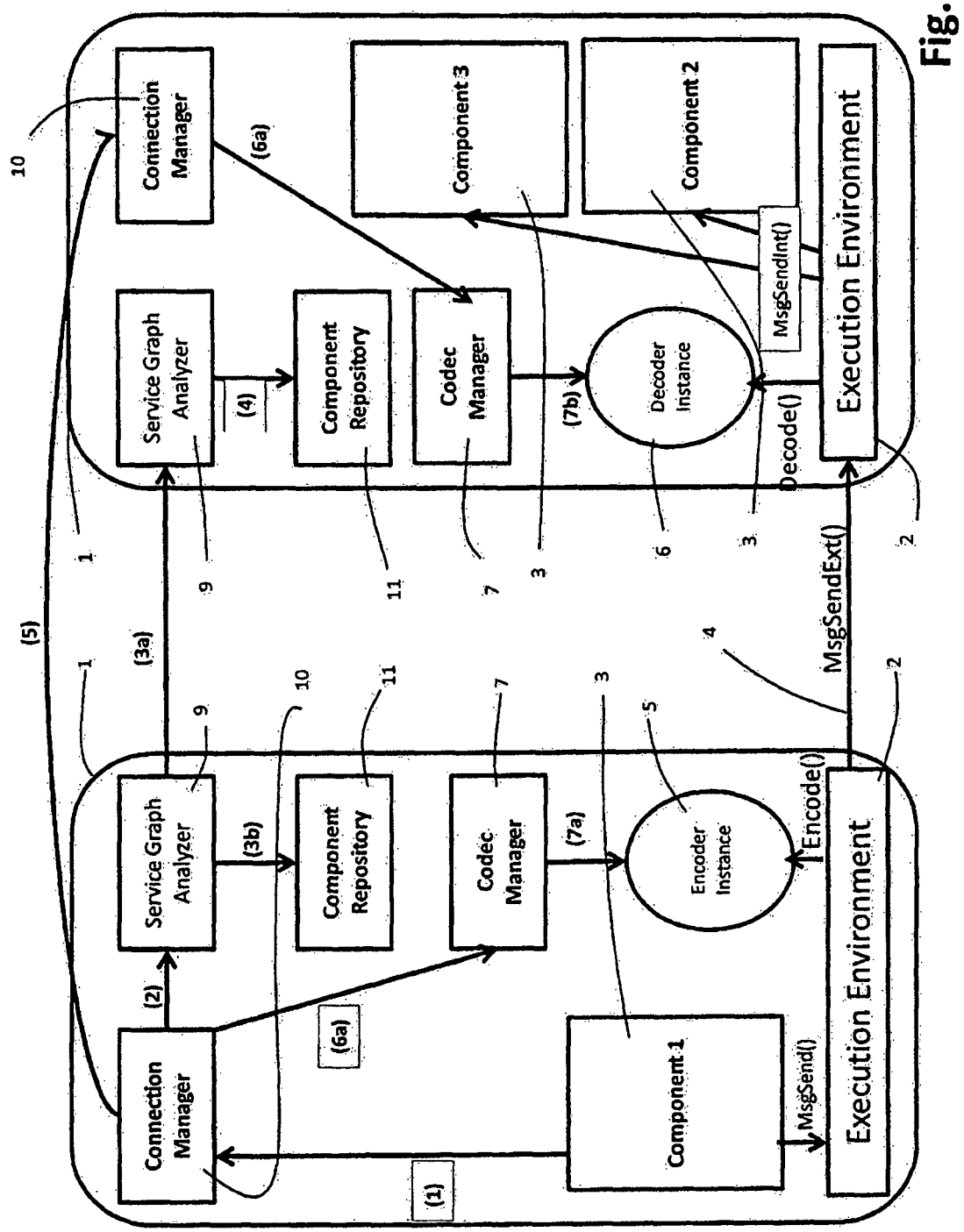
Figure 3:
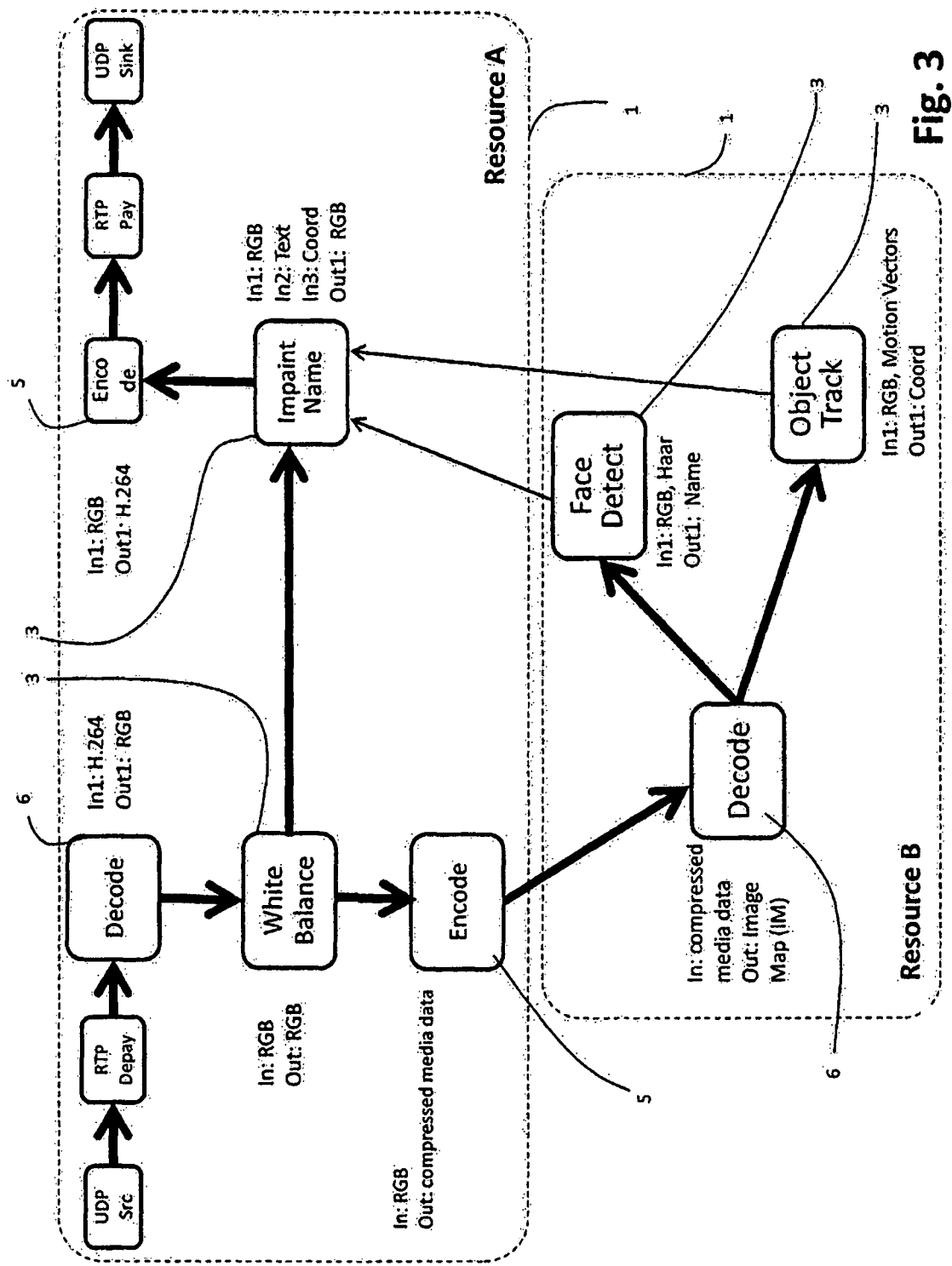
Figure 4:
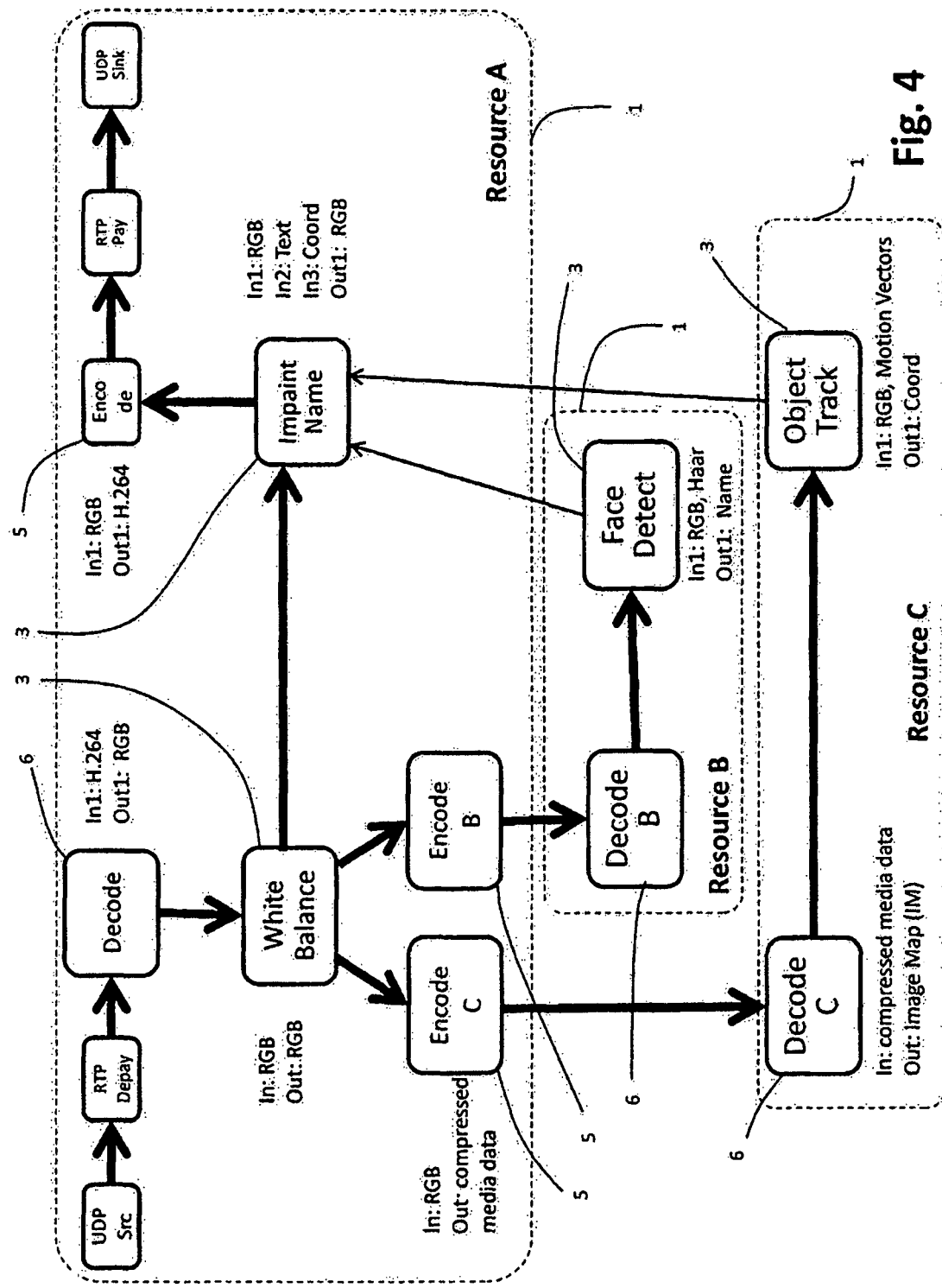
Figure 5:
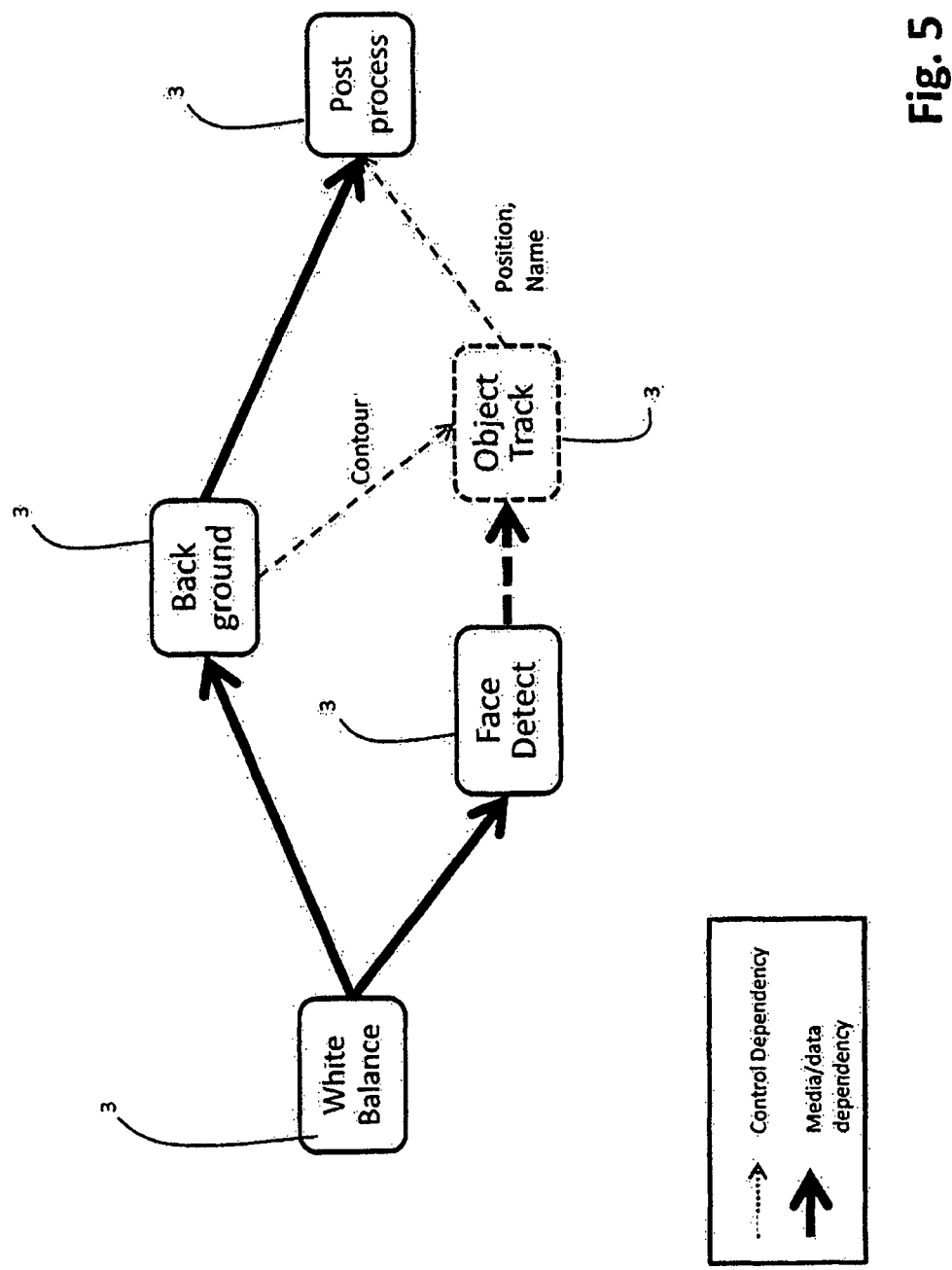
Figure 6:
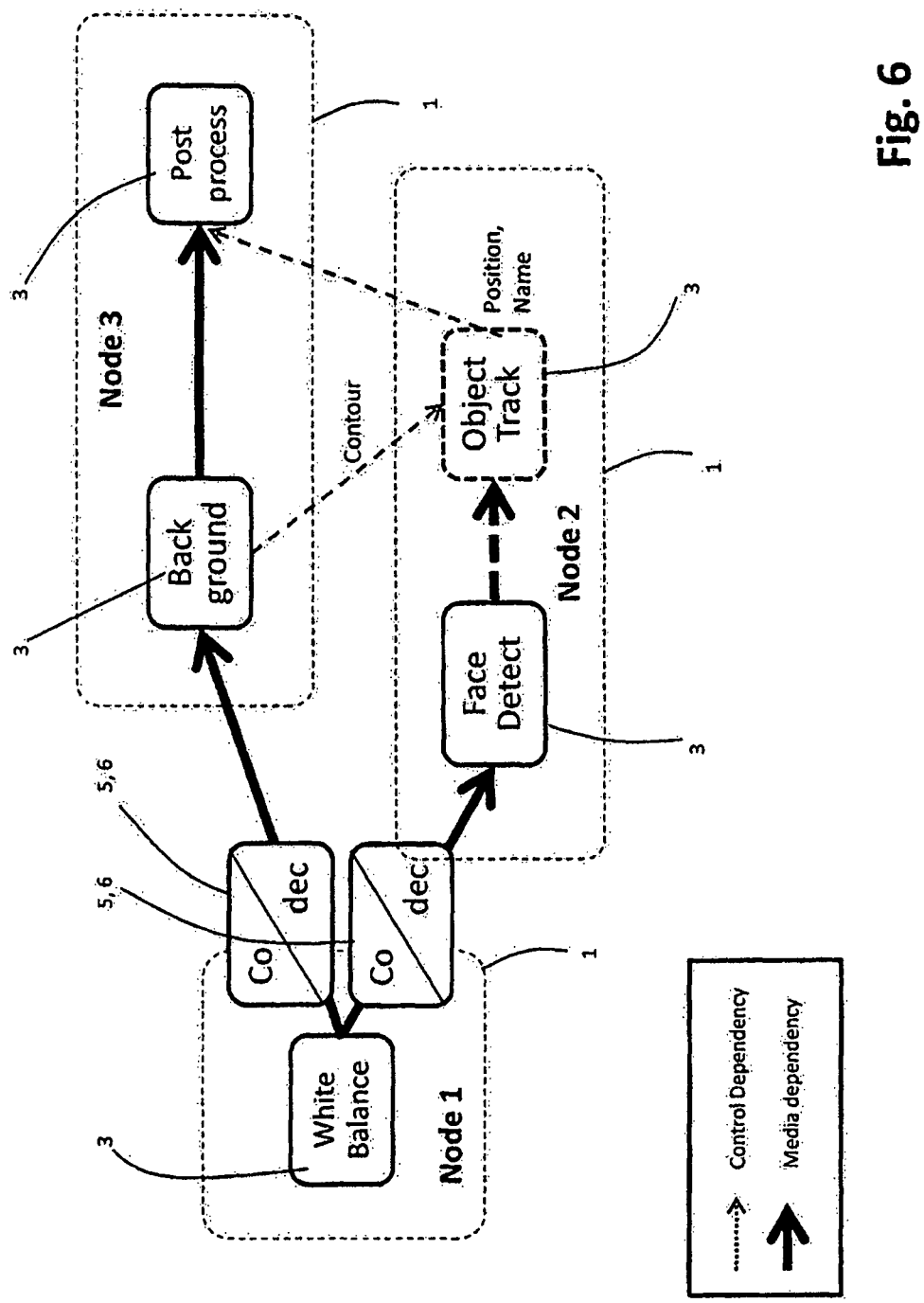
Figure 7:
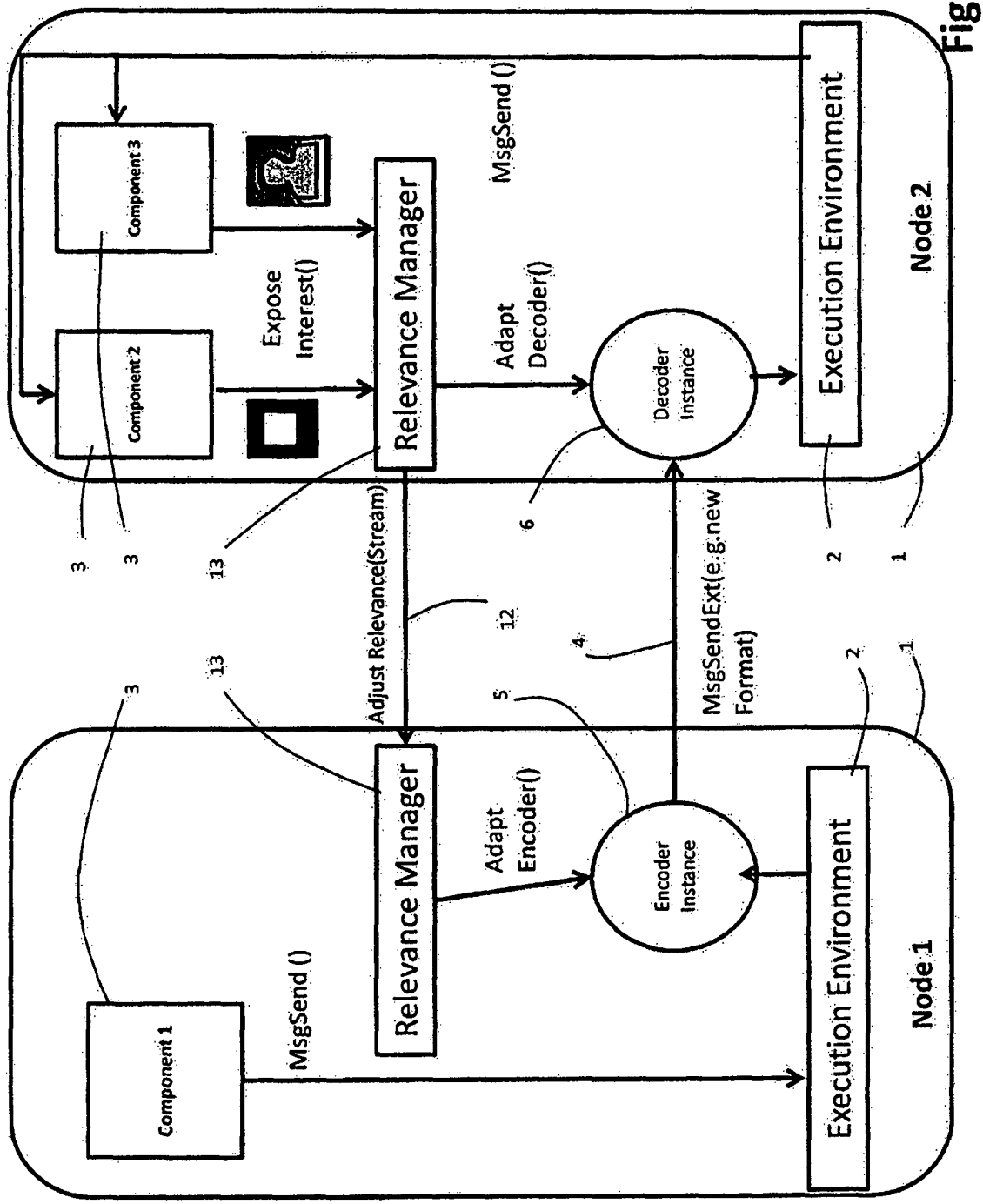

In the following, embodiments are explained with reference to the attached drawings, wherein:

FIG. 1 shows an exemplary service graph of a distributed application processing scenario, FIG. 2 illustrates a system overview, FIG. 3 shows a service graph example with one pair of encoder and decoder between two resources, FIG. 4 shows a service graph example with two pairs of encoder and decoder between three resources, FIG. 5 shows a distributed application processing of providing a name to a person being shown in a video, FIG. 6 shows a distribution of the application of FIG. 5 onto three different nodes of the system, FIG. 7 illustrates a further system overview with a relevance manager in each node, FIGS. 8-11 show examples of a distributed video application processing using relevance information being provided by a relevance map.

It is noted that the embodiments may be technically implemented on cloud servers hosting distributable video and other multimedia applications, end-devices like mobile phones, personal computers, or other computing devices, network cameras and other entities that are able to record or display video and multimedia content, and internet gateways serving as a connection point between actual standard compliant network devices and platform services incorporating the proposed coding format.

In a cloud based processing environment, in particular the following data transport scenarios between separate software tasks executed on distinct processing nodes may apply 1) Media data transport to and from end-devices (e.g. cameras, displays, smart-phones) to a media processing node across a network, e.g. the public Internet.
2) Media data transport between processing nodes within a single data-center. This setup occurs as media processing tasks easily scale out of a single processing node because the media processing is computationally complex (i.e. processing intense).
3) Media data transport between processing nodes located in different data-centers in order to optimize overall resource consumption, e.g. transport resources in the network, and limit delay for man-machine interaction, e.g. by putting the processing close to where the user is.

It is noted here that the present embodiments particularly address cases 2) and 3) and also cover case 1) assuming that control of the transport between end-device and cloud node is provided, e.g. by having the capability to execute dedicated software on the device.

For example, a typical application scenario which profits from distributed processing on a service platform is for example video chat. In the video chat scenario, e.g. a group of people join a virtual shared video environment/video chat room. Each person streams video data of its camera(s) into the cloud. The video chat service combines all media streams of users meeting in such a shared environment and generates (i.e. processes) a personalized view of the virtual room for each participant. Thus, each person in the virtual room receives back a personalized rendered view of other participants.

In the following, selection and/or configuration of codecs (also called codec instantiation) based on knowledge of the processing performed by subsequent processing components of an application is explained based on FIG. 2 which shows a system comprising two processing nodes 1. On the receiving side, one or more processing elements exist that support component specific codec configuration. A first component 3, being a sending component 3 (i.e. it sends data) connects to two receiving components 3. The receiving components 3 are located on a remote node 1. A connection manager 10 invokes a service graph analyzer 9 in order to find and analyze a dependency graph. The dependency graph is a part of the service graph. The dependency graph may be generated by the service graph analyzer 9. The dependency graph may allow determining dependencies based on the content of a specific processing component 3.

At each node 1, the service graph analyzer 9 contacts a component repository 11 in order to retrieve required configuration parameters for a codec for each component 3. After all dependencies in the dependency graph are resolved, the connection manager 10 contacts a local codec manager 7 to instantiate an encoder 5 and send a request to the remote connection manager 10 to instantiate a corresponding decoder 6 and to update service logic's forwarding tables. Thereafter, messages may be exchanged between components, e.g., using standard message passing principles. Other examples may include that the codec managers 7 negotiate codec requirements instead of the connection manager 10.

A possible operation method is explained in the following based on FIG. 2. In a first step (see arrow marked as (1)), the connection manager 10 of the sending node 1 receives information about a connection between components 3 (being identified as "components 1, 2, and 3" in FIG. 2). In a further step (see (2)-arrow), the connection manager 10 requests the service graph analyzer 9 to acquire data dependencies, being e.g. part of a dependency graph. In a further step (see (3a, 3b)-arrows), the service graph analyzer 9 acquires the data dependencies and further acquires information from a component repository 11 as described above. Further, a service graph analyzer on the receiving side also acquires data from a component repository of the receiving node 1 (see (4)-arrow), and the connection managers 10 of both nodes 1 inform each other about selected codec configurations for the communication channel 4 being established between the components 3 (see (5)-arrow). The connection managers 10 of each node 1, then, activate a codec manager 7 of each node 1 to configure the selected codecs. Further, the codec managers 7 instantiate the selected codecs so that encoder 5 and decoder 6 may start encoding/decoding data being sent via the communication channel 4.

Examples for processing elements are, e.g., a face recognizer or an object tracker. A typical implementation of a face detector determines a region of interest based on a filter operation using a cascaded set of simple discriminative classifiers to identify characteristic features of a face e.g., eye region darker than cheeks, eyes darker than bridge of the nose, etc. An object tracker determines the spatial dislocation of a region of interest between one or more frames. A description of the basic feature set the component 3 is working upon may be provided. This description can be used by the underlying platform to determine and parameterize best fitting encoder 5 and decoder 6 pairs.

In a distributed component setting (either by creating a connection between distantly located components 3 or by moving a component 3 to another node 1, the connection manager 10 analyzes the application graph for data dependencies (i.e. which subsequent components 3 operate on the data stream to be compressed). In embodiments, the analyzing of the application graph can be done by the platform by analyzing a forwarding table representing the service logic of the receiving node(s) 1 to identify dependency relationships, e.g., to find all components 3 that directly or indirectly operate on the data stream that needs to be compressed. The table may comprise i.a. entries about communication channels 4 which connect sending and receiving processing components 3 with each other. The analyzing may be done in a recursive manner, i.e. evaluating information from all nodes 1 hosting components 3 that belong to the same processing pipeline. For each of these components 3, the data formats being processable by a component 3 are evaluated by the platform from the component descriptions given by the component developer. From the information retrieved from the data formats, the platform can conclude, which information needs to be included into the compression media stream exchanged between the nodes 1.

The result of the application graph analyzing is returned to the node(s) 1 on which the compression functions will be instantiated and used to instantiate an efficient coding scheme adapted to the processing needs of components operating on the now compressed data stream on adjacent nodes 1.

FIG. 1 shows an exemplary flow graph of a service logic realizing an application that adds a name of a visible person as a text capture to a video stream. A video signal is received from an external source (e.g. a camera) and decoded in the platform (see decoder 6). Then, one or more filters (e.g. a white balance filter) are applied for video enhancement purposes. A face detector is monitoring the image in order to identify the names of visible persons. An object tracker tracks the objects to find the coordinates in the frame where the capture should be placed (e.g. just below a person). A name is rendered at the specified location before a new video stream is encoded (see encoder 5) and sent to a client (or another application). For each component 3, the information required on the input ports to perform its processing task is specified and the corresponding accepted data format indicated (see "In:"). In a similar manner, the data available at the component outputs and the corresponding data format are indicated (see "Out:").

An effective allocation of the logical graph onto physical processing resources, according to network and computing resource utilization, might be to place "Face Detect" and the "Object Track" components 3 on the same processing node 1, letting the rest of the components 3 run on a separate processing node 1. In this case, the output of the "White Balance" component 3 needs to be compressed (i.e. encoded) in order to pass the network link 4 between the processing nodes 1. This exemplary allocation is depicted in FIG. 3. The platform decided to place the "Face Detect" and "Object Track" components 3 on a resource B, whereas the remaining part of the service graph is executed on a resource A. Encoding 5 and decoding 6 functions are provided by the platform.

Based on information retrieved from the component description, the platform (system) determines the best applicable compression format between the resources A and B that will limit the bandwidth requirements of the physical network between the resources A and B. Note that this format is determined at service runtime based on how the logical application is distributed on the resources (i.e. based on which components are deployed behind a physical network link, and the information that is required to be preserved for the processing function of the components) and can change if the deployment of the graph changes. Platform functionality on resource B (FIG. 3) retrieves or requests/collects from the "Face Detect" and "Object Track" components 3 which media information is relevant for the corresponding media processing functions. This information is passed to resource A by the distributed platform functionality, and media encoder 5, which is configured to include only relevant information required by subsequent components 3 behind the bandwidth limited network connection across which the information between the components need to be passed to maintain the logical flow, is instantiated by the distributed platform on resource A. In addition, the distributed platform ensures that also a corresponding media decode function is instantiated on the resource B. In the above example, the encoder 6 incorporates e.g. a Haar-feature transform instead of a DCT, which preserves the information relevant for the face detector. Motion estimation parameters may be calculated and encoded in the prediction model as needed by the object tracker. Any other feature (including details required for image reconstruction) may be eliminated (e.g. color information) or replaced (e.g. image details by codebook vectors for a patch based information preserving reconstruction model). The decoder 6 reconstructs, from the information, the signal with minimal effects on the information that needs to be preserved (e.g. correct dark and light regions and motion vectors) exploiting redundancy (or quantization) of other features in the original image. Thus, the reconstructed image is not necessarily "interpretable" by a human viewer.

In the example depicted in FIG. 3 there is one encoded media stream between the resource A and the resource B. This encoded media stream holds relevant information for all receiving components at the resource B. Platform functionality (e.g. on resource A and/or B) ensures that only relevant information is passed on to the respective receiving components 3. Alternatively, both components 3 may receive all information included in the media stream. A resource (node) may select which information is relevant for which component and forward the information respectively.

Different setups for the encoding/decoding between resources A and B are possible. For example, FIG. 4 shows a deployment with more than two processing resources (nodes). FIG. 4 depicts that there are two encode/decode pairs, one for each receiving component 3. Thus, only relevant information for each respective receiving component 3 is included in each respective encoded media stream. In another alternative, the system may have only two resources (resources B and C would be combined) but still uses two encode/decode pairs, one for each receiving component 3, as shown in FIG. 4

Note that the platform (system) is autonomously instantiating encode/decode pairs (codec) at service runtime whenever a service deployment requires an encoded transport of (media) information between different processing resources. Based on information taken from the component description, the platform can independently decide whether there is need to encode/compress a media stream between two components 3, which communicate via an external link 4, i.e. over a boundary of a node 1, and how to configure the codec for the media stream.

The platform can read from the component description which media information is relevant for the processing of each subsequent component 3 being logically arranged behind the compressed network link 4. Distributed platform functionality (see below) ensures that accordingly configured encode and decode functions are set up on the involved processing resources. As the deployment of a logical service graph can change over time, distributed platform functionality includes and removes encode/decode functionality between different resources according to how the logical service graph is currently mapped onto distributed processing resources.

It is important to note that the developer of the logical service graph does not need to care about setting up this encode/decode functionality. He only needs to define the relevant component description information when defining his service. Even more, this makes the development of the service much easier for the developer as he only needs to care about service logic (i.e. define the service graph and change the logic of the service graph during service runtime) and does not care about which part of the logical service graph needs to be executed on which resource. With help of the proposed automatic encode/decode functionality, the placement of components can be done exclusively by distributed platform functionality.

In embodiments, the components 3 may provide means to receive data either in a pixel domain or in transform/feature domain, eliminating the need for a reconstruction step.

Next, an extension of the above-described example is set forth with the system implementing a feedback loop and using a relevance map weighting, in particular for an application dealing e.g. with multimedia data, such as video or audio data. The application is realized as a component-based system where each component 3 provides a distinct independent functionality. Components 3 communicate particularly through a uni-directional exchange of messages. For example, messages preferably comprise a header and data to be transferred (payload). The message transport is realized through a communication channel 4 (communication system or a link) that determines the receivers of a message.

Data exchanged between components 3 can have substantial size and/or data rates requiring compression when data is leaving a specific processing node 1 towards another processing node 1 using an external network link 4. Preferably, the embodiments concern components 3 which are hosted in a distributed environment, e.g. on a multitude of network connected processing nodes 1 (see e.g. FIG. 2). In order to reduce the amount of data that needs to be communicated between the components 3, the receiving component exposes a dataset describing the relevance of all received data for its processing.

An illustrative example comprises a video application for video chat, in which on a processing node 1 a camera signal is preprocessed (e.g. white balance) and on a further processing node 1 a face detector is run. On a further processing node 1, a background modeling and post-processing is applied. As soon as a face is detected, an object tracker is launched and inserted into the processing pipeline (see FIG. 5). The possible deployment of the components 3 in a distributed cloud environment, using e.g. three physical resources/nodes 1, is depicted in FIG. 6. Encoding/decoding functions 5, 6 are instantiated to compress the media streams transmitted between the nodes, thereby reducing the necessary transmission bandwidth.

In FIG. 7 an architectural sketch of an embodiment is shown. On each node, an execution environment 2 is running, preferably responsible for managing the components 3, the connection between components 3 and the message exchange between components 3. Further, a "relevance manager" 13 is provided which is a node internal function that receives "interests" from all components running on the node 1. When receiving an "interest request", the relevance manager 13 analyzes the dependencies of the components 3 operating on the data stream by interacting with the execution environment 2 in order to check whether an adaptation is required.

is In case that a decoder 6 for the data stream exists, e.g. the relevance manager 13 instructs the sending side relevance manager 13 to adapt the corresponding encoder 5 accordingly. Subsequently, a first message received with an adapted data format will have a trigger. The trigger indicating that a local decoder 6 should be adapted accordingly upon receiving the message with the trigger. Note that the coder 5 may perform a compression step of the data to be exchanged between two components 3 only if the processed data is to be transported over a processing node external network link.

Figure 8:
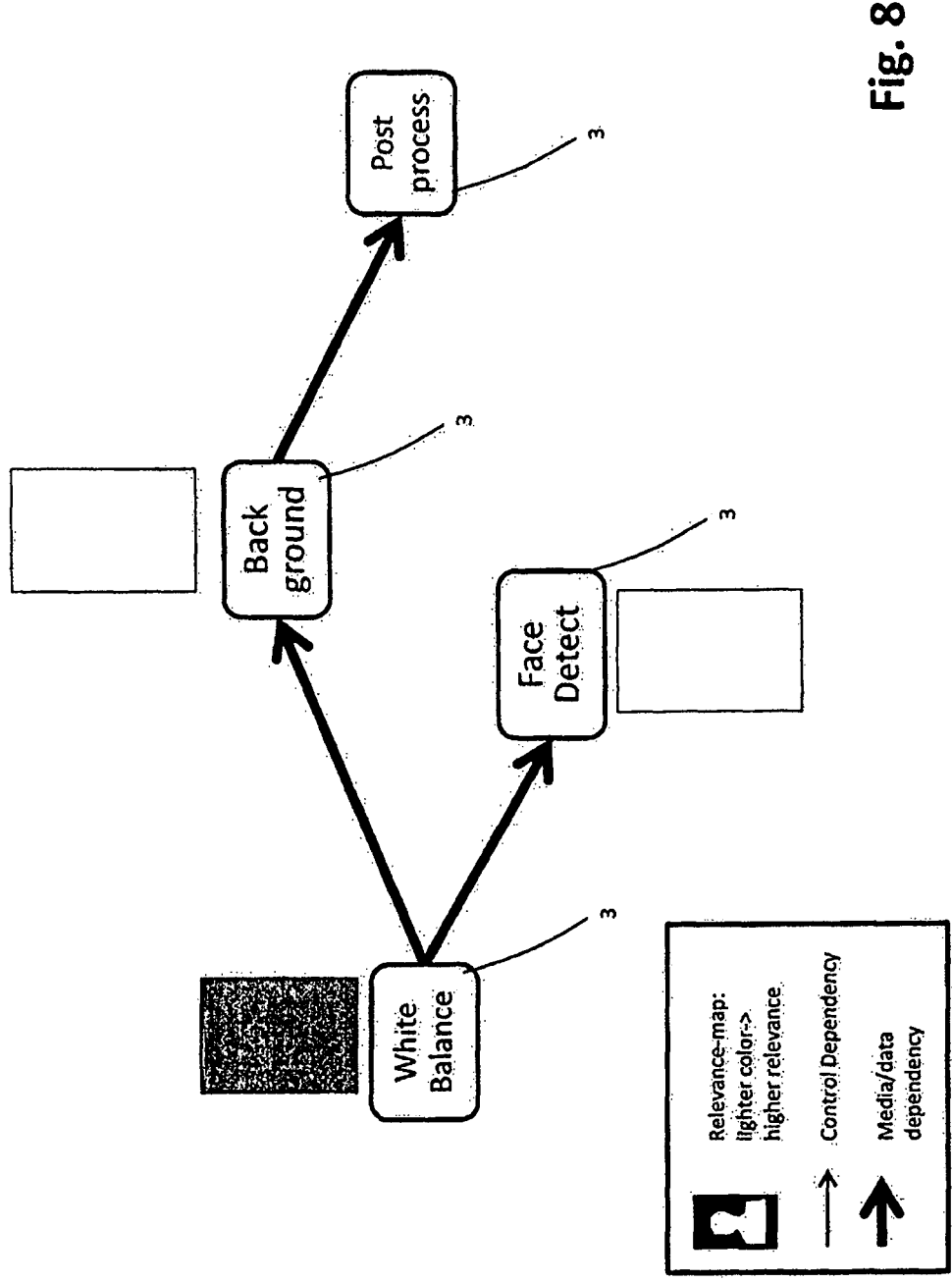
Figure 9:
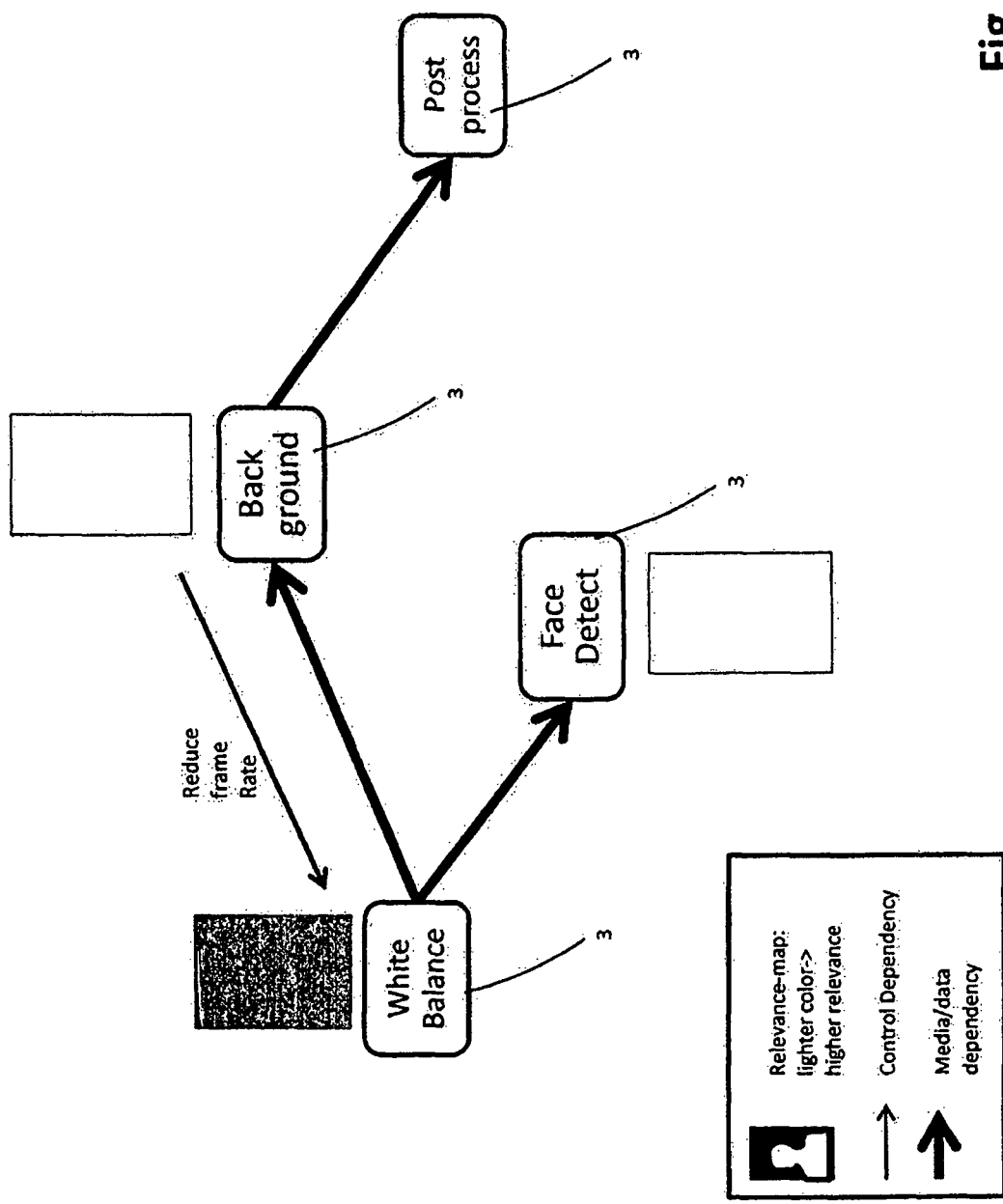

The functionality of the system is explained by using the service logic as set forth above, where components 3 are instantiated as described and components 3 expose their interests in content using platform functionality as described in the context of FIG. 7. For example, initially the background modeling and face detector require the full data available, because statistical models need to be generated (FIG. 8). The interest of the background component would be that all available data needs to be communicated. As soon as the model converges, the background extraction model may decide to reduce the data rate to e.g. 50%. Of course, this could also be e.g. 70% or 20%. This information (see FIG. 9) triggers platform functionality that omits every second frame provided by the preceding white balance function and, thus, delivers only half of the data towards the background component. This example might be applied on the raw data-stream, independent whether the data needs to be compressed in order to reduce the traffic, in case it needs to traverse a processing node 1 external network link 4. The face detect component may further request to receive all data as depicted in FIG. 9.

The above-described aspect is extended in the following by adapting the codec according to the relevance of data of a frame, e.g. with regards to its spatial relevance. In other words, it is e.g. determined which (spatial) parts of an image are relevant for subsequent processing functions and these parts are considered in the priority of the encoding scheme (e.g. proving more bits for the relevant parts), thereby improving efficiency. Non-relevant parts are ignored or coded with low resolution.

Figure 10:
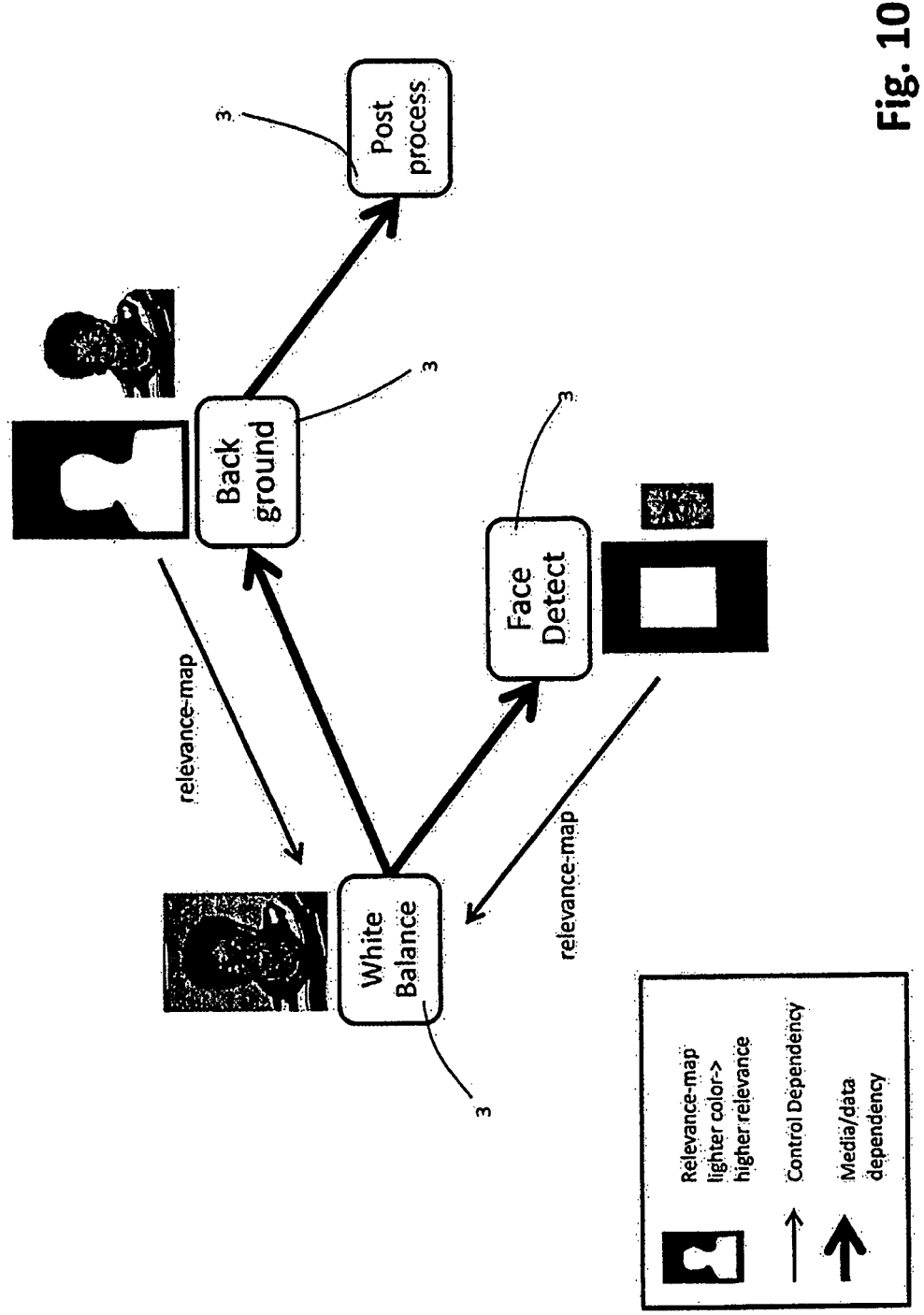
Figure 11:
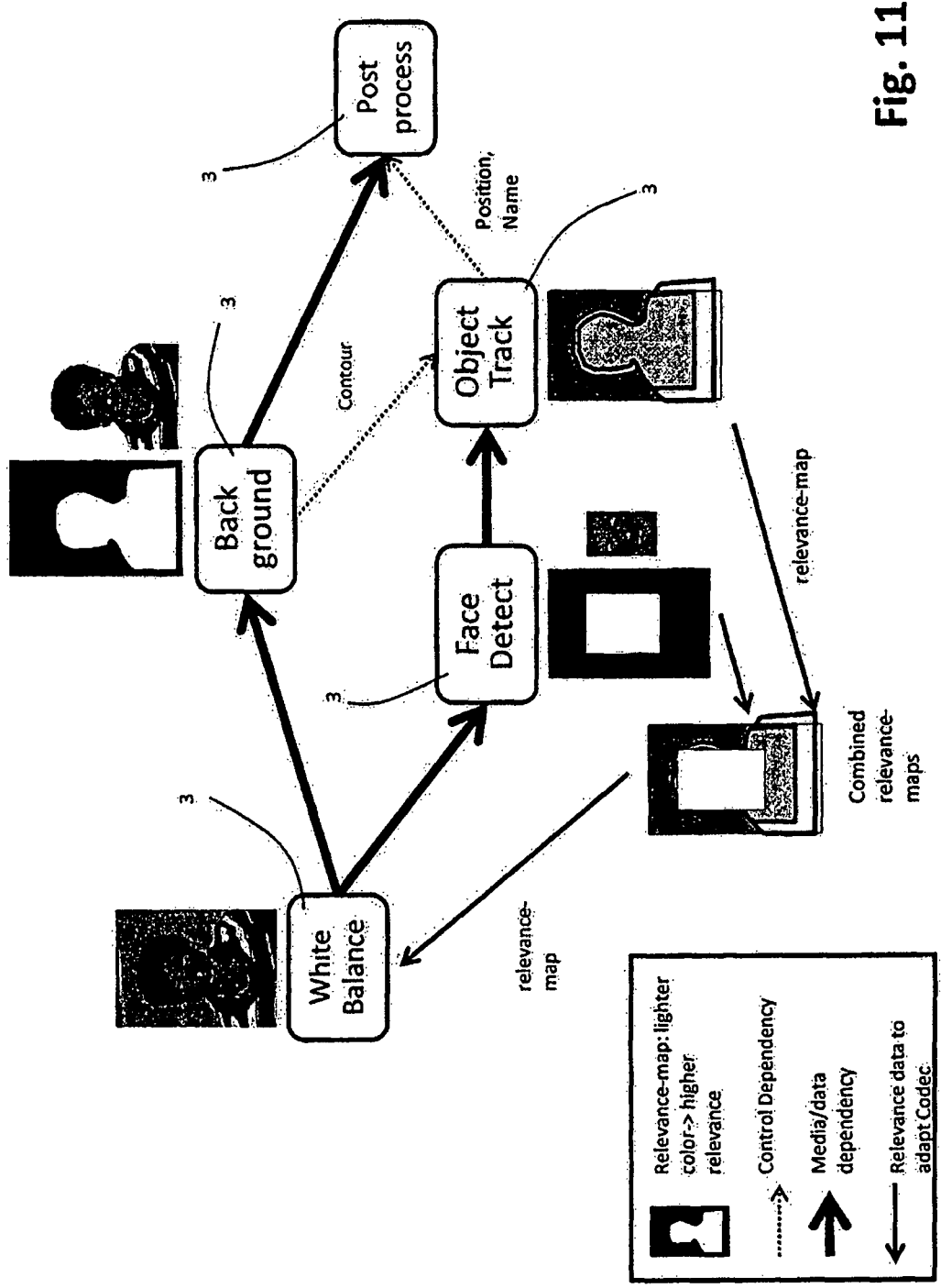

A relevance map may be generated and exposed to the relevance manager 12 of FIG. 7. Alternatively, the relevance manager 12 may request relevance information for generating the relevance map. For example, the output of a face detector model is a mask that enables to separate the face from the non-face region(s) in the original image. After a face has been detected, a tracker may be instantiated to follow the object (FIGS. 10 and 11). It is noted that, for example, in FIG. 10 it is depicted that the background extraction component 3 is interested only in the foreground and updates the respective relevance map accordingly. The face detect component 3 is interested in the face region so that the respective relevance map is updated accordingly. After instantiating of the object track component 3, which is interested in contour data (see FIG. 11), the relevance maps of face detector and object tracker may be joined/combined.

The object tracker component 3 may use the information being exposed by the background extractor to define its interest mask (FIG. 11). Thus, in the example as depicted in FIGS. 10 and 11, the object tracker component 3 is interested in the border area between a foreground and a background of an image or video frame in order to accurately update the relevance map. The foreground area is here, e.g., of higher relevance as changes to the foreground area might easily affect the accuracy of the detection.

Therefore, the relevance map of the face detector component 3 and of the object tracker component 3 are combined to adapt e.g. the resolution in the specific regions according to their interest (FIG. 11). This can be done by providing a mask image represented as matrix containing relevance information for each pixel or block of the original image. For example, the values of the matrix are set between 0 (not used) and 1 (fully relevant). This information is used in the codec to adapt the bit-rate spent for coding a specific block or to simplify encoding, e.g. by replacing a block of a frame in a region containing values "0" with a standard block.

The embodiments also allow combining of relevance maps even by independent components 3 using an appropriate arithmetic operation. Assuming that on the same data-stream a further component 3 removes privacy relevant data, e.g. writings on a whiteboard in the background on the image. Since both components 3 might operate independently, the face region and the whiteboard region might be merged from two different relevance maps.

Changing the values of the relevance map may modify e.g. the number of slices and/or the location of the slice borders. Alternatively, a changing of values might lead to an adaptation of the quantization parameter, indicating a higher/lower interest in the accuracy of the data.

The proposed system allows very flexible deployments of multimedia applications in a distributed (cloud-based) execution environment. Application developers do not need to keep resource constraints in their mind, but manage only the service logic. This means, the cloud becomes virtually a single resource.

While the above describes a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

It should be noted that the description and drawings merely illustrate the principles of the proposed methods and systems. It will thus be appreciated that those skilled in the art will be able to devise various arrangements that, although not explicitly described or shown herein. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments, as well as specific examples thereof, are intended to encompass equivalents thereof.

Furthermore, it should be noted that steps of various above-described methods and components of described systems can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

In addition, it should be noted that the functions of the various elements described in the present patent document may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Finally, it should be noted that any block diagrams herein represent conceptual views. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. An apparatus, comprising:
   at least one processor; and
   at least one memory including computer program code, wherein the at least one memory and the computer program code are configured to, with the at least one processor, cause the apparatus at least to:
   automatically distribute processing components of an application to be run on at least two processing nodes that are connected via a communication channel;
   determine dynamically during service runtime whether a sending processing component and a corresponding receiving processing component that have been automatically distributed are arranged on different processing nodes;
   if it is determined that the sending processing component and the corresponding receiving processing component are arranged on different processing nodes, determine dynamically during service runtime, based on information about processing operations performed by the processing component which receives data, in which representation the data is to be sent via the corresponding communication channel; and
   cause a data converter to convert data to be transmitted from the sending processing component to the receiving processing component into the dynamically determined data representation.

2. The apparatus according to claim 1, wherein possible representations of data include one or more of:
   an original data format of the sending processing component;
   spatially, temporally or spectrally reduced representations of the original data;
   compressed or encoded representations of the original data;
   representations in a transformed domain; and
   features extracted from the original data.

3. The apparatus according to claim 1, wherein the at least one memory and the computer program code are further configured to, with the at least one processor, cause the apparatus at least further to:
   determine an encoded representation of data in case that the data to be transferred through the communication channel is media data, including at least one of video data, audio data or image data.

4. The apparatus according to claim 1, wherein the at least one memory and the computer program code are further configured to, with the at least one processor, cause the apparatus at least further to:
   if it is determined that an encoded representation of data is to be sent via the corresponding communication channel, instruct a codec manager of the sending node to instantiate an encoder based on information about processing applied by a subsequent processing component, and send a request to the receiving component to instantiate a decoder which corresponds to the encoder.

5. The apparatus according to claim 3, wherein the at least one memory and the computer program code are further configured to, with the at least one processor, cause the apparatus at least further to:
   instantiate or adapt an encoder and a decoder during runtime of the application by combining encoding functions which include a type of transform processing, a type of prediction method, a quantization type, and a type of entropy coding.

6. The apparatus according to claim 1, wherein the at least one memory and the computer program code are further configured to, with the at least one processor, cause the apparatus at least further to:
   acquire information on data dependencies between the processing components or information on processing operations performed by receiving processing components, wherein:
   the data dependency information or the processing information is used to determine the representation in which to send data to the receiving components.

7. The apparatus according to claim 6, wherein the at least one memory and the computer program code are further configured to, with the at least one processor, cause the apparatus at least further to:
   determine during runtime of said application whether data dependencies have changed, and wherein the codec manager is adapted to re-configure a pair of corresponding encoder and decoder being instantiated for an existing communication channel.

8. A system comprising at least two processing nodes that are connected by a network, and comprising an apparatus according to claim 1, wherein the at least one memory and the computer program code of said apparatus are configured to, with the at least one processor, cause the apparatus at least to automatically distribute processing components of an application to be run on the system over the nodes, wherein:

each node has an execution environment, and each execution environment includes a connection that connects an outgoing port of a processing component sending data with an inbound port of a processing component receiving data via a communication channel.

9. The apparatus according to claim 8, wherein:

the nodes of a sending component and of a receiving component are further connected via a back-channel;

the back-channel is configured to transfer back information from the node of the receiving component to the node of the sending component; and the sending node is configured to determine in which representation to send data via the communication channel between the sending component and the receiving component based on the received back information.

10. A receiving node comprising:

at least one execution environment;

at least one processing component automatically distributed to the receiving node by an application distribution unit configured to:

automatically distribute processing components of an application to be run on at least two processing nodes that are connected via a communication channel; and determine dynamically during service runtime whether a sending processing component and a corresponding receiving processing component that have been automatically distributed are arranged on different processing nodes; and at least one outgoing port being connectable via a communication channel with a sending processing node for receiving data through the communication channel;

wherein the receiving node is configured to send, to the application distribution unit, information about processing operations performed by the at least one processing component of the receiving node.

11. The receiving node according to claim 10, further configured to:

determine how much a part of received data contributes to a currently ongoing processing and to predict how much of said data will contribute to processing in a temporally-subsequent processing step of the application; and send the determined contribution information to the sending component as back information.

12. The receiving node according to claim 10, further configured to:

update values of the relevance map during application processing based on the back information being provided through the back-channel, wherein values of a plurality of relevance maps of a plurality of processing components are combinable so that a merged relevance-map may be created; and if data is sent from a sending component to a plurality of receiving components through at least one communication channel, adapt a coder and decoder based on said merged relevance map comprising relevance information for each receiving component.

13. The receiving node according to claim 10, further comprising:

a relevance manager for determining a relevance of received data for the processing component of the receiving node; and a storage unit adapted for storing said relevance information in a relevance map, the relevance information comprising information about a relevance of data for the processing of a processing component in a spatial, a temporal or a spectral domain.

14. A sending processing node comprising:

at least one execution environment, at least one processing component, and at least one outgoing port being connectable via a communication channel with a receiving processing node for sending data through the communication channel, wherein the execution environment is configured to establish the communication channel;

the sending processing node further comprising an apparatus according to claim 1, wherein the at least one memory and the computer program code of said apparatus are configured to, with the at least one processor, cause the apparatus at least further to determine dynamically during service runtime, based on information about a receiving processing component being located on the receiving processing node, in which representation to send the data via the communication channel.

* * * * *